United States Patent [19]
Kuchel

[11] Patent Number: 5,135,308
[45] Date of Patent: Aug. 4, 1992

[54] METHOD AND APPARATUS FOR NON-CONTACT MEASURING OF OBJECT SURFACES

[75] Inventor: Michael Kuchel, Oberkochen, Fed. Rep. of Germany

[73] Assignee: Carl-Zeiss-Stiftung, Fed. Rep. of Germany

[21] Appl. No.: 666,363

[22] Filed: Mar. 8, 1991

[30] Foreign Application Priority Data

Mar. 9, 1990 [DE] Fed. Rep. of Germany ....... 4007502

[51] Int. Cl.$^5$ .............................................. G01B 11/24
[52] U.S. Cl. ................................ 356/376; 250/237 G
[58] Field of Search ................ 356/376, 375; 358/107; 250/237 G

[56] References Cited

U.S. PATENT DOCUMENTS

| | | | |
|---|---|---|---|
| 3,894,802 | 7/1975 | Higgins | 356/2 |
| 4,316,670 | 2/1982 | Corwin et al. | 356/349 |
| 4,488,172 | 12/1984 | Hutchin | 358/107 |
| 4,499,492 | 2/1985 | Hutchin | 358/107 |
| 4,564,295 | 1/1986 | Halioua | 356/376 |
| 4,641,972 | 2/1987 | Halioua et al. | 356/376 |
| 4,668,094 | 5/1987 | Matsumoto et al. | 356/376 |

FOREIGN PATENT DOCUMENTS

| | | |
|---|---|---|
| 0262089 | 3/1988 | European Pat. Off. |
| 2125648 | 3/1984 | United Kingdom |
| 2204397 | 11/1988 | United Kingdom |

OTHER PUBLICATIONS

"Moiré Topography" by H. Takasaki, *Applied Optics*, vol. 9, No. 6, Jun. 1970, pp. 1467-1472.
"Scanning moiré method and automatic measurement of 3-D shapes" by Masanori Idesawa et al., *Applied Optics*, vol. 16, No. 8, Aug. 1977, pp. 2152-2162.
"Interferometric phase measurement using spatial synchronous detection" by K. H. Womack, *Optical Engineering*, vol. 23, No. 4, Jul./Aug. 1984, pp. 391-395.

*Primary Examiner*—F. L. Evans
*Attorney, Agent, or Firm*—Eugene Stephens & Associates

[57] ABSTRACT

Two bar patterns are projected sequentially on the object (O) to be measured, e.g., by time-division multiplexing, at angles which are inclined toward each other. The bar patterns are produced by projectors having respective rectangular gratings. The periods of the gratings are the same, and the phase relationship of the gratings is fixed relative to each other. Each reflected bar pattern, as distorted by the surface of the object, is individually and sequentially recorded by a camera (K); and the bar phases ($\psi_1$, $\psi_2$) of each sequentially reflected bar pattern are calculated for each image point by a computer connected with the camera. The computer also computes the differences ($\Delta\psi$) between the bar phases of the two projections for each image point. These phase differences remain stationary even when the bar patterns are moved relative to the camera. A plurality of phase differences for each image point is stored, averaged, and then used to calculate the height measurement (z) for each image point for display on a television monitor (42).

18 Claims, 6 Drawing Sheets

METHOD AND APPARATUS FOR NON-CONTACT MEASURING OF OBJECT SURFACES

TECHNICAL FIELD

The present invention relates to a method and apparatus for the non-contact measuring of object surfaces by means of bar patterns which are projected on the surface of the object; detected, e.g., by a video camera; and evaluated.

BACKGROUND

There are a number of different known methods by which relatively large surface areas of an object can be simultaneously measured along x, y and z coordinates by projecting a regular, grating-shaped pattern onto the surface of the object. These methods, which are referred to as "moire topography", include different variants whereby the so-called moire effect (created by light which passes twice through a grating having the same period) is utilized to obtain height information pertaining to the object being measured.

One of these variants is the "shadow pattern" moire method described by Takasaki in *Applied Optics* 6 (1970), page 1467, in which the object surface to be tested is illuminated by point-source light that is passed through a grating positioned relatively close to the surface. The surface of the object is then viewed through the same grating, but from a point distant from the source of the measuring light, so that the illumination rays and the reflected imaging rays subtend an angle. Inasmuch as the grating pattern projected on the object surface is deformed as a function of the topography of said surface, contour lines are formed as a result of the moire effect as the imaging rays pass through the same grating; and these contour lines provide surface height information. With this method, the contour lines remain visible even if the basic frequency of the grating used for illumination is not resolved at the time of imaging, or even if the grating is "averaged away" by being shifted by one or more full grating periods during the recording of an image.

Another variant of the moire topography method is the so-called "projection moire" method described in U.S. Pat. No. 4,564,295. According to this method, an image of a grating is projected on the object surface, and an image of the object surface is then projected through a lens and a second grating positioned in front of the recording camera. This prior art method permits synchronous shifting of the two gratings—i.e., the projection grating and the grating used for imaging—during the imaging operation, thereby averaging out grating irregularities without changing the contour lines resulting from the moire effect or their location in space. However, this method requires that the gratings have the same grating constant and that the focal lengths of the projecting unit and the imaging lens be the same. This prior art patent further discloses that two projectors can be positioned symmetrically at the same distance and the same angle of projection on either side of the path of measuring rays, i.e., the camera axis. This double projection arrangement generates overlapping and adjoining grating patterns, thereby eliminating the problem of shadows when measuring severely curved object surfaces.

A third variant of the moire topography method dispenses with the second grating at the front of the recording camera and, instead, uses the line raster of the recording video camera or the pixel period of a CCD camera for the function of the second grating. This so-called "scanning moire" method is described in *Applied Optics*, Volume 16, No. 8 (1977), page 2152.

In addition to these just-described moire topography methods, it is also known that an object can be measured by calculating height information directly from the deformation of a bar grating pattern on the object surface without using a second grating in front of the camera. These so-called "bar projection methods" are described in European Patent No. EP-A2-0 262 089, and in U.S. Pat. Nos. 4,641,972; 4,488,172; and 4,499,492.

These prior art moire topography methods and bar projection methods produce quantitative coordinate measurement information by evaluating the cyclical brightness variations of the resulting bar patterns or contour lines. Generally, this is called phase measurement; and this is usually carried out in such a manner that, during the process of making each measurement, the position of the projection grating is shifted in several steps by fixed increments, often corresponding to a phase shift of 90° or 120°.

However, with these known methods, it is relatively difficult to obtain adequate measurements of larger industrial objects, particularly if the surfaces of such objects have irregularities such as edges and tiers. The difficulty arises for the following reason:

Due to the symmetrical perspective arrangement of the projection and viewing rays, the distance of successive contour lines is not constant, but increases with the increasing depth of the object; and without the knowledge of the actual distance of the object surface from the camera at at least one point, it is not possible to obtain data pertaining to the form of a profile of a continuous surface. That is, such conventional methods of phase measurement calculate the object distance only in terms of one complete change of phase and, thus, provide only relative values within one ordinal number of a moire pattern. Therefore, it is not possible with these methods of phase measurement to accurately analyze the sudden large changes in the cyclical bar patterns that occur over the edges and tiers of irregular industrial objects.

Another problem relating to the use of said prior art measuring methods arises from the fact that these methods require or permit the bars projected on the surface being measured to be moved, resulting in a loss of reference between the bar or contour lines and the coordinate system fixed relative to the apparatus. While it is still possible to connect the measurements made with the different positions of the moving projection grating with high accuracy, this necessitates that the location of the gratings in each position be known absolutely within fractions of one grating period. Therefore, this requires that each shift of the grating must either be measured with great accuracy (which is possible only with relatively great effort and expense) or that the positions between which shifting occurs be maintained as precisely as possible. Unfortunately, this latter requirement is not easily accomplished, because even minor changes in the position of the surface to be measured relative to the measuring instrument, e.g., such as those resulting from minor vibrations, will result in uncontrollable phase changes which will affect the measured result.

Further, it should be noted that when accurate resolution of objects having great height variations is desired, the focus of the camera must be adjusted for various depth ranges. However, this cannot be readily accomplished with prior art systems because, when the focus is moved, it is inevitably accompanied by small lateral shifts of the image of the object being measured relative to the projection grating or the camera. Such shifts change the measured phase relationships of the bar lines or contour lines; and therefore, error-free measurements can no longer be obtained when adjustments in focus settings are required.

Still further, the prior art methods are relatively slow, because accurate phase measurement requires the recording of at least three sequential images of the shifting bar pattern.

The present invention overcomes these problems by providing a moire-type measuring method and apparatus characterized by high accuracy in which the measurement is quite insensitive to interfering environmental influences.

SUMMARY OF THE INVENTION

Non-contact measurement of object surfaces is made by projecting at least two bar patterns on the surface and recording reflections of said patterns with a video camera, and by using a computer to evaluate the image of the patterns recorded at a plurality of points on the object surface. The projected bar patterns have the same period and are directed onto the surface at an inclined angle relative to each other. The reflection of each bar pattern, as distorted by the object surface, is separately recorded; and the computer calculates the phase relationship of each separate pattern at each of the points relative to a mathematical reference pattern. The phase relationships calculated for each separate bar pattern are stored and, thereafter, compared with each other and used to compute the height measurement for each point.

Since the two projected bar patterns have the same period and are projected on the surface at different angles, their reflections produce beat frequency moire patterns which can be evaluated to yield height information pertaining to the surface of the sample. However, since the reflections of the two bar patterns are recorded separately, the beat frequency is generated only in the computer; and it is, therefore, independent of the position of the bar patterns relative to the camera so long as the phase relationships between the two projection gratings remain fixed relative to each other. Further, the contour lines defined by the beat frequency of the reflected patterns remain stationary even though the gratings move relative to the surface and/or the camera. Thus, this novel method makes it possible to shift the gratings relative to the camera without causing any change in the contour lines, such shifting being desirable for the purpose of increasing the accuracy of the calculated phase measurements by providing several different measurements for each point and by averaging out grating irregularities.

Therefore, the accuracy of measurements made by the inventive method is unaffected by interfering environmental influences, such as vibrations, which can result in small changes in the relative positions of the camera and the gratings. Further, the camera focus can be changed to increase the resolution of the images reflected from different areas of the object surface without changing the calculated phase measurements or the computed comparisons of these phase measurements and, therefore, without changing the height information based upon these measurements. Also, since it is possible to shift the gratings (again, without changing their positions relative to each other) between each recording of several different sets of bar pattern images, different parts of the surface being measured can be illuminated optimally, enhancing light-metering dynamics for image recording.

It is the physical relationship of the two projector gratings to each other that determines the height measurements computed by the inventive method; and, by keeping this relationship constant, it is possible to accomplish the just-described advantages which can be achieved when the grating patterns are moved together. To facilitate this feature of the invention, both gratings are mounted on, or manufactured as integral parts of, the same support member.

Since the invention's computer-calculated phase differences remain stationary even when the projection gratings are moved together, these phase differences can be readily accumulated for each monitored point for several respective video images, even when the gratings are moved before or during the recording of each image. Therefore, each of the respective images contributes to the accumulated phase differences, which can be averaged for higher accuracy.

The separately-recorded bar patterns can either be projected successively in chronological sequence or in some other manner coordinated by time-division multiplexing. However, the invention also can be carried out by the simultaneous projection of the two bar patterns, using different color light for the illumination of each grating, the images being recorded by separate color-divided cameras.

While the invention can be performed using only two projectors in the manner just-described above, it is preferable to use three or more projectors arranged so that the inclined angle between two of the bar projections is small compared to the inclined angle between either one of said two projections and the third bar projection. In this way, the wavelength of the beat frequency resulting from the comparison of the images of said two small-angle projections is long in contrast to the beat frequency resulting from the comparison of the images of said other two projections. This provides a desired expansion of the range over which the phase-difference measurements remain unambiguous, and this is accomplished without requiring the use of gratings having different grating periods.

It is also preferable to project the bar systems in a telecentric manner, thereby causing the distance between contour planes having the same phase differences to remain constant. The same applies to the camera's path of viewing rays: when the path of viewing rays is telecentric, the image remains at infinity and image size does not change when the camera's variable focus is adjusted to different parts of the object.

The preferred embodiments also use gratings with sinusoidal/cosinusoidal transmission characteristics to form bars with sinusoidal intensity on the surface of the object. The phase relationships between such sinusoidal patterns can be evaluated easily and with accuracy. Using rectangular gratings, an approximately sinusoidal intensity distribution can be achieved on the object surface even though the grating image is projected out of focus, or even if a slotted diaphragm is positioned in the Fourier plane (i.e., pupil) of the projection lens.

As noted above, the projection gratings are preferably mounted on a common support. The support should have a low coefficient of thermal expansion and be resiliently suspended for movement, e.g., by a spring-biased rocker, in a grating plane positioned in front of the camera. This provides a design which is particularly insensitive to environmental influences.

DRAWINGS

DETAILED DESCRIPTION OF BASIC AND PREFERRED EMBODIMENTS

Figure 1:
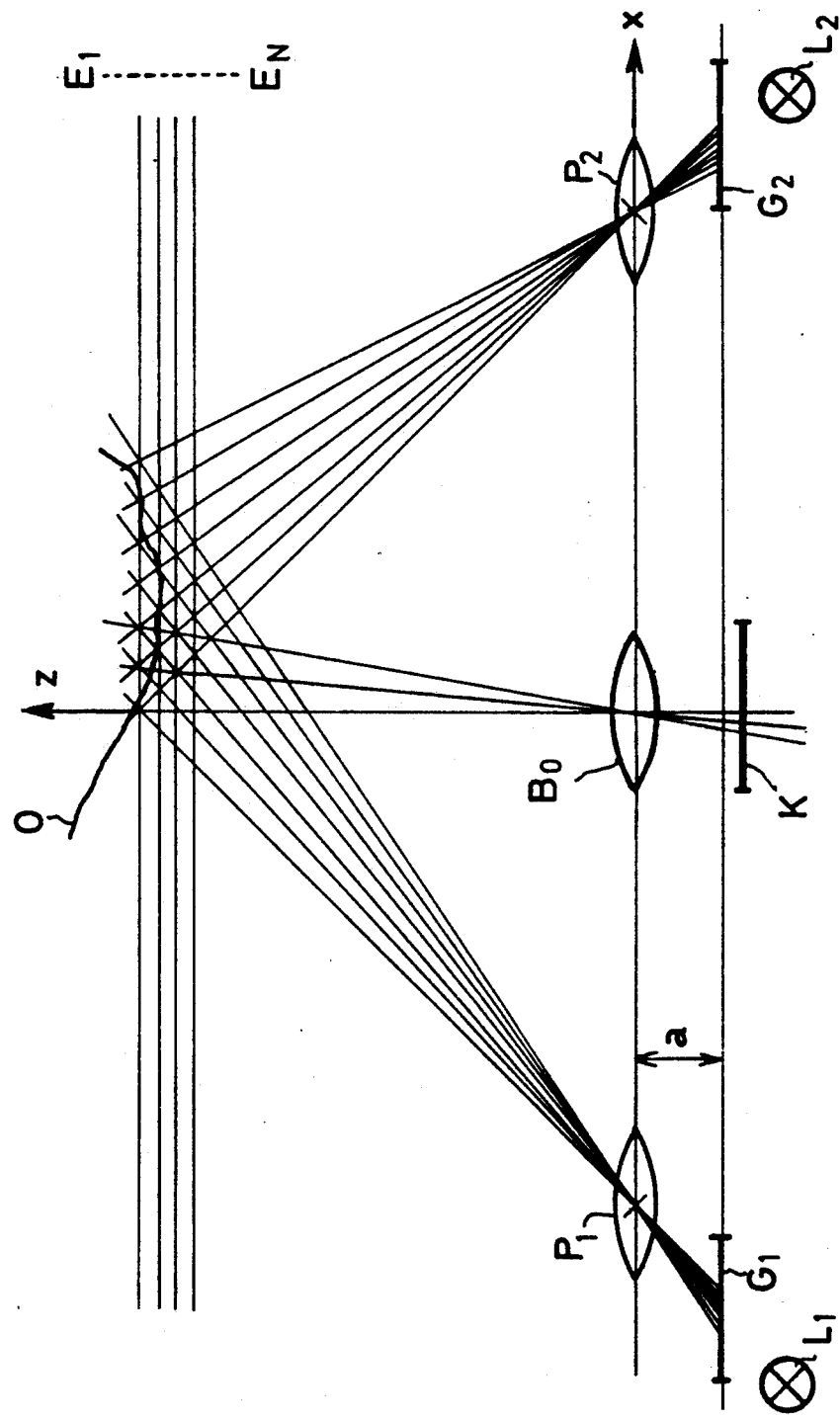
FIG. 1 is a schematic diagram showing the geometrical setup of the optics of a basic embodiment of the invention herein.

The basic embodiment of the invention illustrated in FIG. 1 comprises two projectors with lens systems ($P_1$) and ($P_2$) which project images of two gratings ($G_1$) and ($G_2$), illuminated by two light sources ($L_1$) and ($L_2$), respectively, on the object (O) to be measured. The gratings ($G_1$) and ($G_2$) have the same grating constants (i.e., the same period) and are located on the same plane at a distance (a) behind the projection centers of the lenses ($P_1$) and ($P_2$). The projected gratings produce respective bar patterns with sinusoidal intensity characteristics on the surface of object (O).

In the vicinity of the apparatus where object (O) is arranged for measurement, there is a plurality of planes ($E_1$ through $E_N$) in which the intersecting bar patterns projected by the two projectors ($P_1$, $P_2$) have constant phase differences. However, these constant phase differences are not visible on the surface of object (O), because the two grating patterns are projected alternately in chronological sequence.

Positioned between the two projectors ($P_1$, $P_2$) are a video camera with video optics ($B_0$) and a camera sensor (K). Sensor (K) records the reflected images of the bar patterns sequentially projected by projectors ($P_1$, $P_2$) as those patterns are deformed by the irregular surface of object (O).

The evaluation of the camera sensor signals is best described by reference to the simplified block circuit diagram of FIG. 2. The output of the television camera (1) is fed via an analog-to-digital converter (2) to an image storage RAM (3) which temporarily stores the images of each sequentially projected bar pattern. However, RAM (3) acts only as a buffer and, if the connected electronic system is fast enough, may not be needed.

The digital video signal is then fed in parallel to two "convolution" components (4a, 4b), each of which receives signals relating to a group of contiguous image points, using those signals to calculate the sine and cosine, respectively, of the bar phase at each of a plurality of preselected image points. Algorithms for making such calculations are described in Optical Engineering, Volume 23, No. 4 (July/August 1984), pages 391–395.

The signals corresponding to the cosine and sine of the bar phase at each preselected point are fed to the inputs (A) and (B) of a component (5) which, by means of the arc tangent A/B, calculates the bar phase ($\psi$) by using phase values ($\psi$) which are filed in a look-up table LUT (6) as a function of the arc tangent.

The output of component (5) is connected alternately with two parallel connected image storages (7a) and (7b) by means of a multiplexer (MUX) which is also connected with camera (1). The phase values ($\psi_1$) for all image points of the bar pattern projected via projector ($P_1$) going to storage (7a), and the phase values ($\psi_2$) relating to the bar pattern projected by projector ($P_2$) are read into storage (7b). Image storages (7a) and (7b) are temporary and, furthermore, are connected with a subtraction stage (8). There, during the next step, the difference ($\Delta\psi$) between the phases ($\psi_1$) and ($\psi_2$) of the two bar patterns for each individual image point is determined and fed to another image storage RAM (9). Hence, RAM (9) stores the stationary phase differences ($\Delta\psi$), each of which represents a direct measurement of the object distance (z). RAM (9) is a buffer storage connected via a digital-to-analog converter (10) with the input of a monitor (11) on which the measurement results are displayed. Points having the same phase differences produce height layer lines (contour intervals) describing the topography of the object.

Since, as explained above, the phase differences ($\Delta\psi$) generated in the computer itself are stationary, and since, therefore, the calculated z-information is not a function of the camera position relative to object (O) or relative to projectors ($P_1$, $P_2$), the phase differences ($\Delta\psi$) of many sequentially recorded camera images can be stored in RAM (9) and then averaged to improve the signal-to-noise ratio. While the bar images are being recorded, the camera may be focused step-by-step in order to put the entire object into focus; and during these focus changes, the information pertaining to each calculated object distance remains substantially constant. Likewise, both gratings can be shifted together during the measuring process in order to illuminate the object optimally or to enhance the evaluation with additional, more accurate phase measurements based on the shifting of the gratings and the averaging out of grating irregularities.

Figure 2:
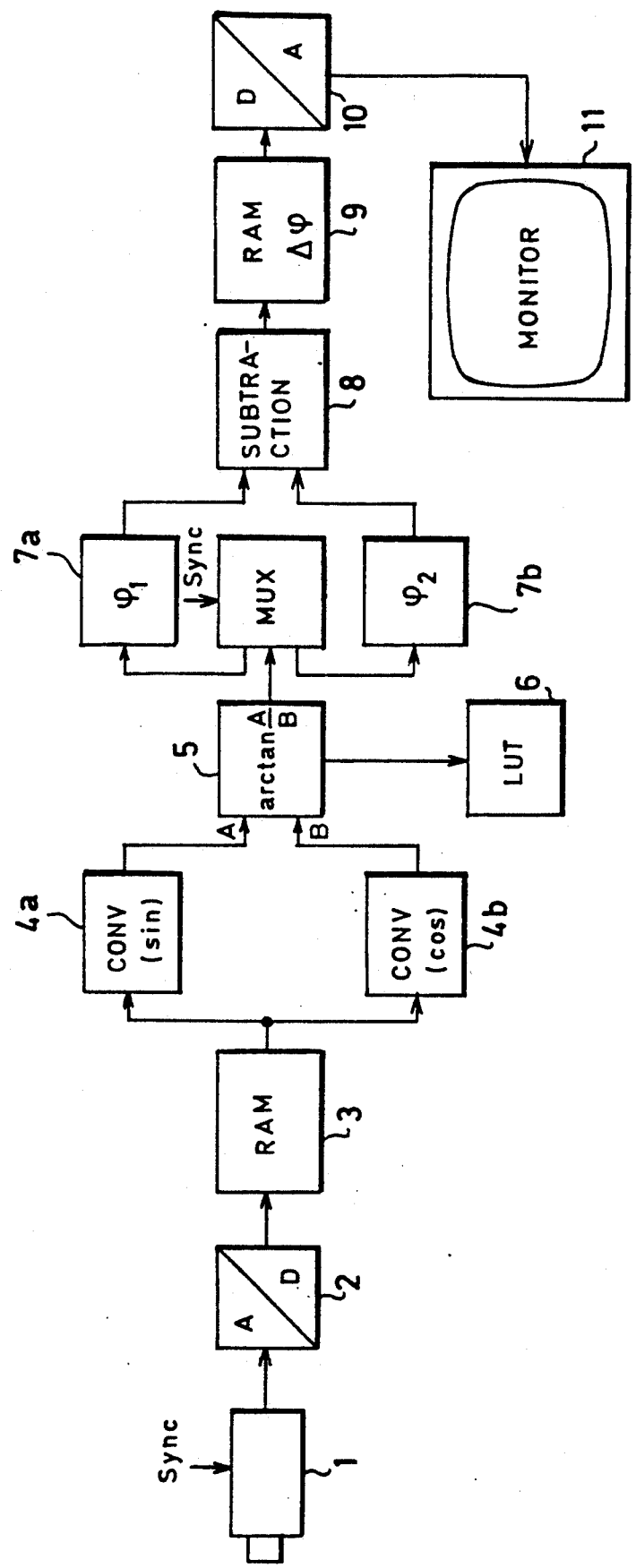
FIG. 2 is a simplified block diagram of the computer circuit used for evaluation of the measurement signals of the embodiment of FIG. 1.

Nonetheless, when measuring objects having relatively large height variations, the basic embodiment shown in FIGS. 1 and 2 may be troubled with ambiguity problems which arise due to the fact that phase difference computations are only based upon differences in intensity of the interfering bar patterns which occur within a single wavelength of the beat frequency. However, these ambiguity problems can be overcome by the use of a third projector as shown in the preferred embodiment of the invention illustrated in FIGS. 3 through 5.

Figure 3:
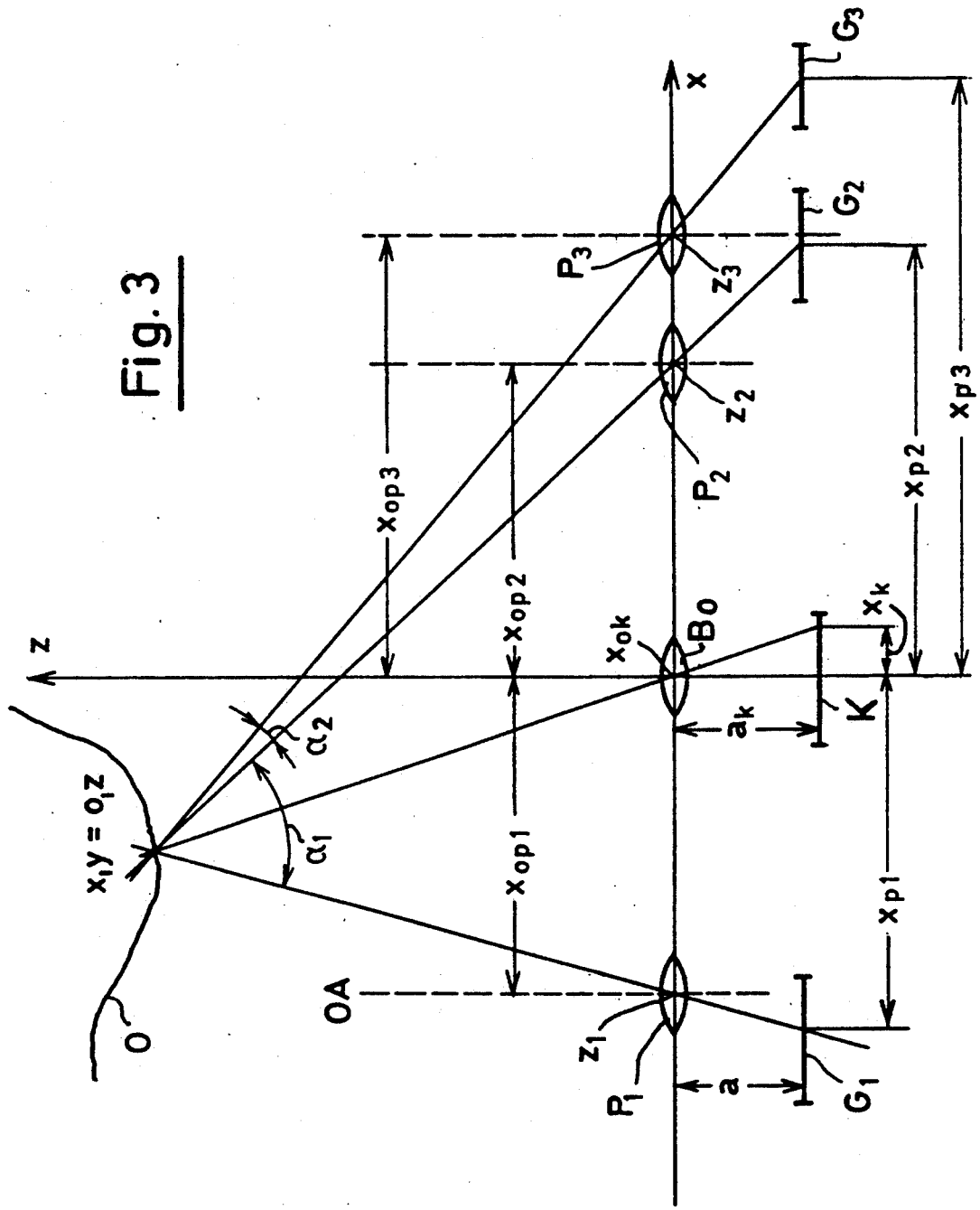
FIG. 3 is a schematic diagram of a preferred embodiment in which another grating projector has been added.

The schematic illustration of FIG. 3 shows a measuring system which essentially comprises three projectors with projection lenses ($P_1$, $P_2$, $P_3$) and three gratings ($G_1$, $G_2$, $G_3$), each having the same grating period. As similar to the system in FIG. 1, camera sensor (K) with attached lens ($B_0$) is provided between projectors ($P_1$) and ($P_2$). While the projectors ($P_1$, $P_2$) are inclined toward each other at a relatively large angle ($\alpha_1$) of approximately 30°, the two adjacent projectors ($P_2$) and ($P_3$) subtend a relatively small angle ($\alpha_2$) of, for example, 0.5°. Angle ($\alpha_2$) is too small to be illustrated in its actual size in the drawings, being achieved in actual practice by arranging projector (P2) and grating (G2) below the drawing plane, while projector (P3) and grating (G3) are arranged above the drawing plane. Shifting of the projectors and gratings in directions parallel to the grating lines does not affect the evaluation of the projected bar patterns, and the projector lens systems are simply arranged so that the projection centers (Z1, Z2, Z3) are aligned along a straight line as shown in FIG. 3.

With this three-projector arrangement, it is possible to define two sets of "constant-phase-difference" plane surfaces perpendicular to the z-axis (i.e., two sets of planes, each similar to planes $E_1$-$E_N$ in FIG. 1). Namely, the phase differences occurring between the bar patterns of projectors P1 and P2 create one set of planes, while those relating to the bar patterns of projectors P2 and P3 create another set of planes. Thus, successive surfaces having the same phase differences can be associated with two different effective wavelengths ($\lambda_{eff}$) in the z-direction. The effective wavelength ($\lambda_{eff}$) is determined by the period of the gratings (G1, G2, G3) and the respective angles ($\alpha_1,\alpha_2$) between the projection axes of the respective projectors. Since the periods of the gratings (G1, G2, G3) are the same, the effective wavelength ($\lambda_{eff}$) is a function of only the respective angles ($\alpha_1,\alpha_2$).

Below are derivations of equations which can be used to calculate the object coordinates (x), (y) and (z) from the bar patterns for the individual points of the object surface projected by the three projectors (P1, P2, P3). This requires that the projection centers (Z1, Z2, Z3) of the projection lenses be located on a straight line extending in the x-direction and that the three gratings (G1, G2, G3) be arranged at the same distance (a) behind said straight line. As shown by the perspective sketch of FIG. 4, the gratings are provided on a common support (W) consisting of glass or another material exhibiting a low coefficient of thermal expansion, e.g., Zerodur, and can be moved together in this fixed relationship relative to CCD camera (K) in the direction of the straight line (x) by means of a spring-biased rocker (not shown). Also, projectors (P1, P2, P3) are provided on a common support (not shown), said support consisting of the same material as the grating support (W). Sufficient heat conduction between the two supports assures a low temperature gradient between them. This reduces the influence of environmental temperature on measuring accuracy. The photosensitive part of the camera, i.e., the CCD sensor, is arranged at a distance ($a_K$) behind viewing lens (B0).

The schematic illustration in FIG. 3 substantially defines the geometric configuration of the invention's measuring system. The grating locations ($X_{p1}$, $X_{p2}$, $X_{p3}$) projected on the surface of object (O) at point (x,y=o,z) are recorded by video camera (K). The center ($X_{ok}$) of camera lens (B0) is the origin of the coordinate system predetermined by the alignment of projectors (P1, P2, P3). By the construction of similar triangles as generally indicated in FIG. 3, the following relationships are obtained for each of the three projectors:

$$\frac{x_{p1} - x_{op1}}{a} = \frac{x - x_{op1}}{z} \quad (1)$$

$$\frac{x_{p2} - x_{op2}}{a} = \frac{x - x_{op2}}{z} \quad (2)$$

$$\frac{x_{p3} - x_{op3}}{a} = \frac{x - x_{op3}}{z} \quad (3)$$

and for the camera:

$$\frac{x_k}{a_k} = \frac{x}{z} \quad (4)$$

The combination of the camera equation (4) with the projection equations (1)–(3) results in the following derivations:

$$z = \frac{x_{op1} \cdot a}{(n_1 + \delta_1)P + x_k \frac{a}{a_k}} \quad (5)$$

$$z = \frac{x_{op2} \cdot a}{(n_2 + \delta_2)P + x_k \frac{a}{a_k}} \quad (6)$$

$$z = \frac{x_{op3} \cdot a}{(n_3 + \delta_3)P + x_k \frac{a}{a_k}} \quad (7)$$

where the differences ($X_{opi}$−$X_{pi}$, i=1..3) are expressed as representing ($n_i+\delta_i$) times the bar period (P) with ($n_i$) representing an element of the natural numbers and ($\delta_i<1$).

If the relationship between the separately-recorded bar patterns of two projectors is considered and phase differences are established, the following are obtained from equations (5), (6) and (7):

$$z = \frac{(x_{op1} - x_{op2}) \cdot a}{(n_1 - n_2 + \delta_1 - \delta_2)P} \quad (8)$$

$$z = \frac{(x_{op1} - x_{op3}) \cdot a}{(n_1 - n_3 + \delta_1 - \delta_3)P} \quad (9)$$

$$z = \frac{(x_{op2} - x_{op3}) \cdot a}{(n_2 - n_3 + \delta_2 - \delta_3)P} \quad (10)$$

or $$z = \frac{K_1}{N_1 - \Delta_1} \quad (11)$$

$$z = \frac{K_2}{N_2 - \Delta_2} \quad (12)$$

$$z = \frac{K_3}{N_3 - \Delta_3} \quad (13)$$

where:

$K_1$, $K_2$, $K_3$ represent apparatus constants,
$N_1=n_1-n_2$, $N_2=n_1-n_3$, $N_3=n_2-n_3$ and
$\Delta_1=\delta_1-\delta_2$, $\Delta_2=\delta_1-\delta_3$, $\Delta_3=\delta_2-\delta_3$.

Equations (11), (12) and (13) describe planes exhibiting constant phase differences ($N_i-\Delta_i$) between each of two projections, said planes being parallel to the x/y-plane. These planes are not a function of the viewing point ($X_k$, $Y_k$) of the camera. The integral numbers ($N_1$, $N_2$, $N_3$) and the fractions ($\Delta_1$, $\Delta_2$, $\Delta_3$) must be determined for measurement.

Surfaces having the same phase difference, as expressed by equations (11), (12) and (13), can be associated with each of the different beat frequencies, i.e., surfaces with the same phase differences related to each effective wavelength ($\lambda_{eff}$). Relatively short effective wavelengths exist for the equation (11) resulting from a combination of the projectors ($P_1$) and ($P_2$) and for the equation (12) resulting from a combination of the projectors ($P_1$) and ($P_3$), while the combination of the two projectors ($P_2$) and ($P_3$) expressed by equation (13) is associated with a relatively long effective wavelength. It is essential that the gratings, projectors, and camera be mounted relative to each other in a fixed relationship, thereby assuring the stability of the angles ($\alpha_1$) and ($\alpha_2$) and the stability of the different effective wavelengths.

For evaluation of the measurements by a computer, equations (11), (12) and (13) can be reformulated:

$$z = \frac{K_1}{\text{int}\left(\frac{K_1}{K_3} N_3 + \frac{K_1}{K_3} \Delta_3 - \Delta_1\right) + \Delta_1} \quad (14)$$

$$z = \frac{K_2}{\text{int}\left(\frac{K_2}{K_3} N_3 + \frac{K_2}{K_3} \Delta_3 - \Delta_2\right) + \Delta_2} \quad (15)$$

For complete determination of the coordinates (x), (y) and (z) of a selected image point, the lateral coordinates (x) and (y) are calculated satisfying the law of conjugate points as follows:

$$x = \frac{x_k}{a_k} \cdot z \quad (16)$$

$$y = \frac{y_k}{a_k} \cdot z \quad (17)$$

For evaluation, the bar patterns projected by the three projectors ($P_1$, $P_2$, $P_3$) are recorded by time-division multiplexing through lens ($B_0$) of camera (K) and read separately into different image memories. The object coordinates (x), (y) and (z) are computed, in accordance with the above-disclosed formulae, by an image-processing computer in the manner described below in conjunction with FIGS. 5a and 5b. The computer processes the image data in video real time. For this purpose it is set up in the form of a pipeline, including partially parallel data paths, and is controlled by a commercially available process computer, e.g., a Neumann host computer.

The evaluation computer will now be described in greater detail, making reference to the block circuit diagram in FIGS. 5a and 5b. The computer comprises three different functional modules (A), (B) and (C). The functional module (A) provides the interface between the external sensors and the control components of the apparatus. Module (A) comprises an analog-to-digital converter (12) which digitizes the signal of camera (K) in video real time. The amplification factor for A/D (12) is controlled as a function of the output signal of a photodiode (13) so that the video signal can be adapted to different brightness conditions or energy outputs of the light sources ($L_1$, $L_2$, $L_3$) [see FIGS. 3 and 4] which are preferably flashlamps. To control the selective operation of the flashlamps ($L_1$, $L_2$, $L_3$), module (A) also includes a trigger circuit (31) which is synchronized with camera (K). Module (A) further contains an electronic control (32) for the motor with which lens ($B_0$) of camera (K) can be focused for different object ranges as indicated by the arrow ($Pf_2$) in FIG. 4. The timing of projector flashes and the focus adjustment of the lens are controlled by an appropriate program in the conventional host computer which, while not shown in FIG. 5, is symbolically represented by the "Host" arrows which appear in the module (A) block and also at three points in the module (B) block in the circuits shown in FIGS. 5a and 5b.

The digitized video signal, upon leaving analog-to-digital converter (12), is fed to the inputs of two parallel convolution components (14a) and (14b) of the functional module (B). These two components (14a) and (14b) carry out a convolution operation in order to determine the sine and cosine, respectively, of the bar phase at the individual image points, as explained above (see reference to convolution components 4a and 4b in FIG. 2). The outputs of components (14a) and (14b) are fed to a circuit (15) where the bar phase is calculated from the sine and cosine. For this, a table associated with the circuit (15) contains the arc tangent function. At the same time invalid measured values calculated on the basis of the phase values in the circuit (15) are masked. Invalid values are those which were recorded with either too high or too low an illumination intensity and whose level therefore is either above or below a certain limit. Masking for these invalid image areas is generated in module (C), which parallels the measured-data circuitry of module (B). Module (C) will be described in more detail hereinafter.

The output of the circuit (15) is fed, via an arithmetic logic unit (ALU), to three parallel RAM image storages (17a-c) where the bar phases ($\delta_1$, $\delta_2$, $\delta_3$) of the bar patterns projected sequentially by the three projectors ($P_1$, $P_2$, $P_3$) are stored temporarily by time-division multiplexing. In three additional image storages (18a-c), correction values are stored which have been calibrated to describe phase distortions of the bar patterns projected by the three projectors, said distortions resulting from geometric imperfections in the optical setup of the apparatus. These correction values are subtracted from the bar phases ($\delta_1$, $\delta_2$, $\delta_3$) in ALU (16). The corrected phase values are returned to image storage (17a-c) and are then further processed in a second computing unit, ALU (19), which computes the differences ($\Delta_1 = \delta_1 - \delta_2$) and ($\Delta_2 = \delta_1 - \delta_3$). These values are required for calculation of the object distance (z) satisfying equations (11), (12) and (13). [NOTE: For calculating equation (13) as well as equations (14) and (15), ($\Delta_3 = \Delta_2 - \Delta_1$).]

Figure 5A:
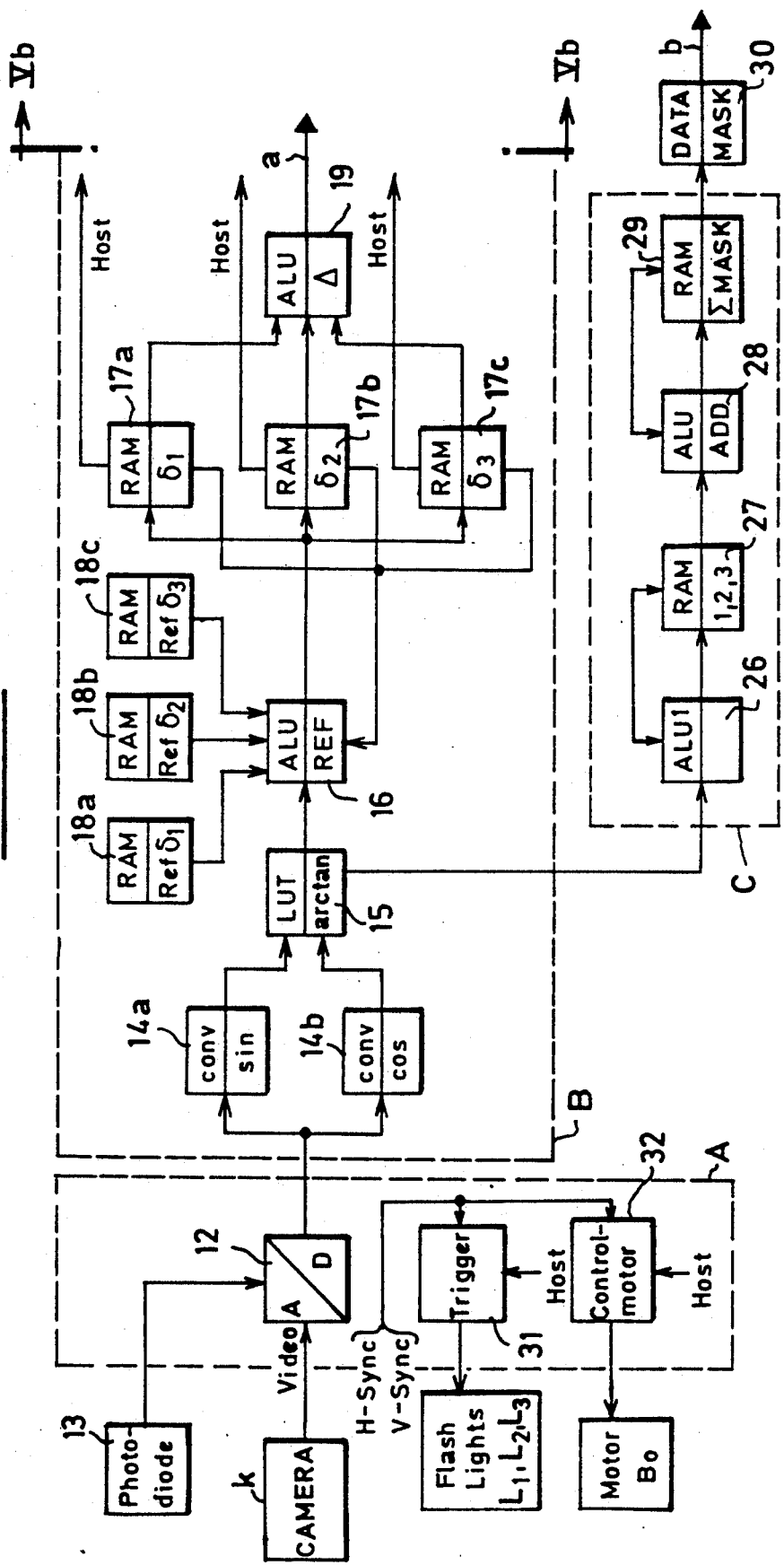
FIGS. 5a-5b are partial block diagrams of essential elements of the invention's computer circuit for evaluating the moire patterns reflected from objects when using apparatus according to FIGS. 1 and 3.
Figure 5B:
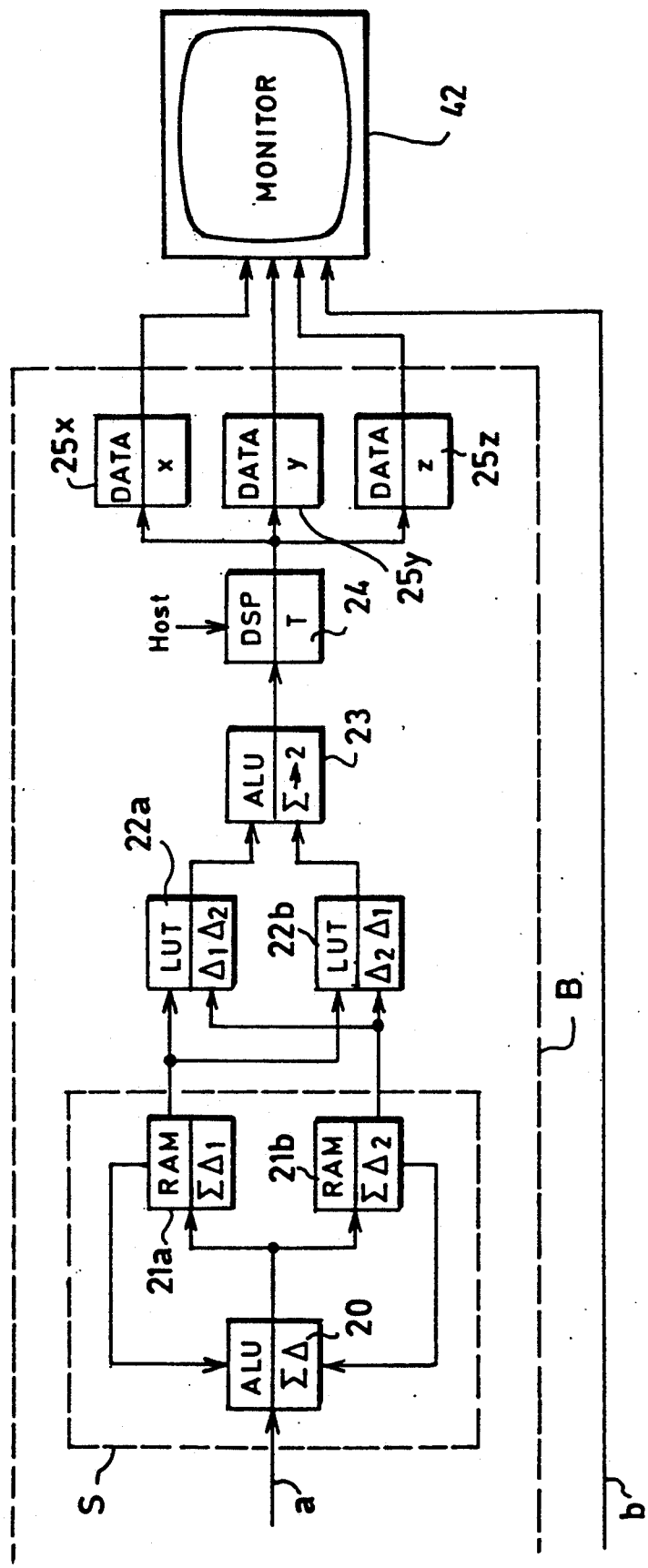

ALU (19) is followed by a summation stage (S) [See FIG. 5b] which comprises ALU (20) and two RAM storages (21a, 21b). The phase differences ($\Delta_1$, $\Delta_2$) for each image point are accumulated in RAMs (21a) and (21b). This may be accomplished, for example, by integral arithmetic process in such a manner that the 8-bit input values of the signals representing the phase differences ($\Delta_1$, $\Delta_2$) are summed up within a data range of 16 bits in storage units (22a) and (22b). In this way it is possible to average the phase differences (for each pixel or other preselected image point) obtained from 255 images and thus improve the accuracy of phase measurement.

The averaged phase difference measurements for each point are fed from image storage units (21a) and (21b) to two successive additional computing units (22a) and (22b), where the formulas for calculating the object distance satisfying equations (14) and (15) are available in additional look-up tables. Computing units (22a) and (22b) compute two values for the object distance (z) which are averaged out in computing unit (23). In a subsequent digital signal processor, DSP (24), the coordinates (x) and (y) of each image point are calculated, satisfying equations (16) and (17) from the measured values for (z) and from the apparatus constants $(x_k)$, $(y_k)$, and $(a_k)$ supplied by the host computer. These x, y, and z values are then displayed on TV monitor (42).

By employing the described method, height information concerning the object to be measured can be obtained absolutely and not only in terms of modulo $2\pi$ of the grid pattern.

The above-described method of evaluation requires that the signals produced by camera (K) be generated in the linear region of the camera's characteristic curve and that, in particular, there be no undershoot or overshoot. Further, the described method requires that, within each sequence of images of the three bar patterns, a phase value is continued to be processed only when the phase values in all three images of the sequence are valid for a specific image point. These validity computations are carried out in module (C) of FIG. 5a. The validity of a measured value is checked in the look-up table (LUT) associated with computing unit (15). The AND-link of the three video image sequences is generated in the computing unit ALUI (26), together with a recursively connected RAM component (27). During subsequent computing stage (28), the number of valid measured values in each image point is calculated and then stored in RAM (29). The number of such measured values represents the number of video images over which phase differences are summed up in stage (S) of FIG. 5b. If a suitable limit is selected which defines a minimum number of valid measurements for each image point, all image points are excluded where the number of valid measurements is below this limit and only remaining image points are included in the calculation of the result. The data mask defined in this manner is represented symbolically by block (30) in FIG. 5a. It can be used to darken appropriate image point locations of video monitor (42).

The just-described computer circuitry processes the camera signals in accordance with the method of the invention herein. By this means, the bar patterns are projected in sequence by the three projectors ($P_1$, $P_2$, $P_3$) by time-division multiplexing, and the images are recorded by camera (K) and processed in sequence. However, it is also possible to project the bar patterns simultaneously, for example, in different colors, and to record them simultaneously with three color-divided cameras. This multicolor system requires that the input channel, i.e., analog-to-digital converter (12), convolution components (14a, 14b), and the time-division multiplexing computing units (15, 16), must be repeated to comprise three parallel units. While this increases costs, it does offer a greater bandwidth in the processing frequency. Conversely, although the described computing operations could also be run on an appropriately programmed high-performance conventional computer, operating sequentially, such sequential operation so greatly increases running times that real time processing of the video signals would not be possible.

Figure 4:
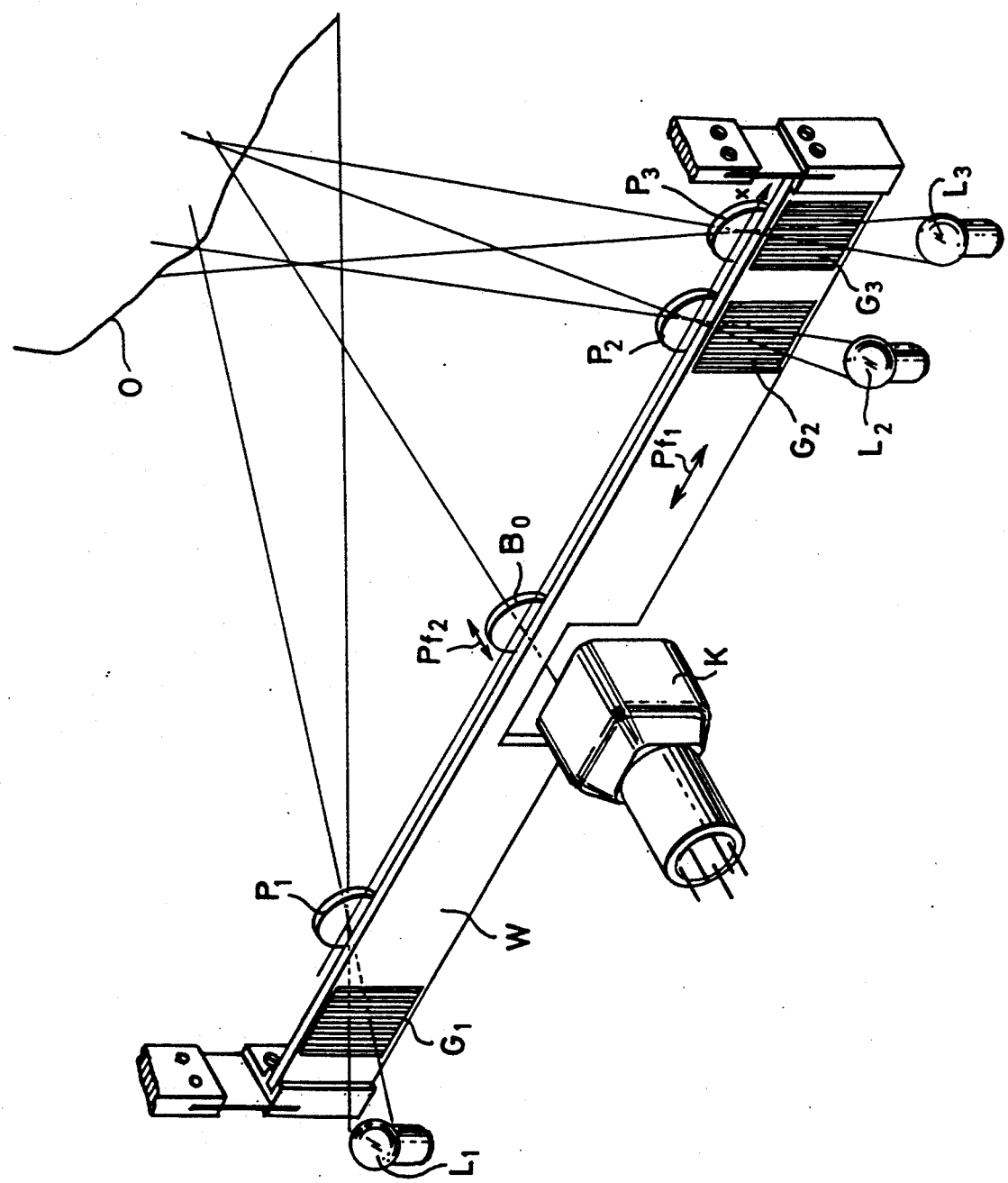
FIG. 4 is a perspective illustration of the essential components of the apparatus shown schematically in FIG. 3.

Since the gratings used for projecting the bar patterns are fixed relative to each other, and since the just-described method computes the z-measurement as a function of the difference of two projections, e.g., the bar patterns of projectors ($P_1$) and ($P_2$) or those of projectors ($P_2$) and ($P_3$), support (W) with its gratings ($G_1$) through ($G_3$) [see FIG. 4] can be shifted in the direction of the arrow ($P_{f1}$) without affecting the z-values obtained during signal evaluation. In conjunction with this, several sets of measurements may be carried out using different positions of the grating support (W) so that different areas of the gratings are illuminated for each set of measurements. Since individual measurements of the phase differences ($\Delta\psi$) of all images are added up and averaged, statistical errors (resulting either from manufacturing imperfections of the gratings or during any individual application of the evaluation algorithm) can be improved by $\sqrt{N}$ where N represents the number of measurements. At the same time, the intensity of the projected illumination can be selected from zero to saturation so that useful measured values may possibly be obtained from all points of the object surface, including those which may exhibit widely different reflectances. In conjunction with this, the electronic mask (module C of the circuit in FIG. 5a) assures that all measurements in the non-linear range of camera (K) will be discarded.

In the just-described preferred embodiment, each projector has its own light source ($L_1$, $L_2$, $L_3$). However, it is also possible to use a single light source, directing the light sequentially to each of the projectors by means of an appropriately controlled optical directional coupler.

I claim:

1. In a method for the non-contact measurement of object surfaces by projecting bar patterns on the object surface, detecting reflections of said patterns with a video camera, and evaluating the camera images of said reflections with a computer to calculate height measurements for a plurality of points on said object surface, the improvement comprising the steps of:

projecting at least two bar patterns on the object surface, the patterns having the same period and being projected at an inclined angle relative to each other;

separately recording the image of each bar pattern at each of said plurality of points;

calculating the phase relationship ($\psi_1$, $\psi_2$) of each reflected bar pattern for each said point; and computing the differences between the phase relationships calculated for each bar pattern for each said point ($\Delta\psi$) and using said computed bar phase differences to determine the height measurement (z) for each point in the direction of the camera axis.

2. The method according to claim 1 wherein said projecting step further comprises:

illuminating at least two respective gratings having the same period, the phase relationship of said gratings being fixed relative to each other, whereby said computed bar phases and said height measurements for each point remain unchanged even when said projected bar patterns are shifted relative to said camera.

3. The method according to claim 1 comprising the further steps of:

separately recording several video images of each projected bar pattern for each of said plurality of points;

repeating said calculating and computing steps for said several images; and storing and summing the computed bar phase differences ($\Delta\psi$) for each said point.

4. The method according to claim 1 wherein said projecting step comprises projecting at least two bar patterns ($G_1$, $G_2$) in chronological sequence, and wherein said recording, calculating, and computing steps are controlled by appropriate time-division multiplexing.

5. The method according to claim 1 wherein said projecting step comprises projecting each of at least two bar patterns ($G_1$, $G_2$) in different colors, and wherein said recording step comprises using appropriately color-divided cameras for separately recording the image of each bar pattern at each of said plurality of points.

6. The method according to claim 1 wherein said projecting step further comprises projecting said bar patterns telecentrically.

7. The method according to claim 1 wherein said projecting step comprises projecting three or more bar patterns ($G_1$, $G_2$, $G_3$) so that said inclined angle ($\alpha_2$) between two of said projections ($P_2$, $P_3$) is small when compared to the inclined angle ($\alpha_i$) between one of said two projections ($P_2$) and a third projection ($P_1$), whereby the effective wavelength of the beat frequency resulting from the comparison of the images of said two projections ($P_2$, $P_3$) is long in contrast to the beat frequency resulting from the comparison of the images of said other two projections ($P_1$, $P_2$).

8. The method according to claim 7 wherein said camera has a variable focus, and comprising the further steps of:

separately recording several video images of each projected bar pattern for each of said plurality of points;

changing the focus of said camera in between said separate recordings of several video images;

repeating said calculating and computing steps for each of said several images; and storing and summing the computed bar phase differences ($\Delta\psi$) for each said point.

9. In apparatus for the non-contact measurement of object surfaces, said apparatus having:

at least two projectors ($P_1$, $P_2$) for generating and projecting bar patterns onto the surface of the object to be measured;

video camera means (K) having an axis aligned with the object to be measured for recording images of bar patterns reflected from a plurality of points on the surface of the object; and means for evaluating said recorded images;

the improvement comprising:

respective gratings ($G_1$, $G_2$) associated with each projector for the generation of said bar patterns, said gratings having the same periods;

means for distinguishing the images relating to the respective bar patterns generated by each projector;

calculating means associated with said evaluation means for determining the phase relationships of the images of each respective bar pattern at each of said plurality of points; and computing means associated with said evaluating means for establishing the differences between the phase relationships of said respective bar patterns at each of said points.

10. The apparatus of claim 9 further comprising:

means responsive to said computed bar phase differences for determining the height measurement (z) for each point in the direction of said camera means axis.

11. The apparatus of claim 9 further comprising:

storage means associated with said evaluating means for accumulating said phase differences for several video images.

12. The apparatus of claim 9 wherein said gratings are positioned so that their projected bar patterns are sinusoidal and cosinusoidal, respectively.

13. The apparatus of claim 12 wherein said gratings are rectangular.

14. The apparatus of claim 9 wherein said gratings ($G_1$, $G_2$) are fixed to a common support (W) and arranged in a common grating plane which can be moved relative to said camera means (K).

15. The apparatus of claim 9 further comprising a third projector ($P_3$) having its own respective grating ($G_3$), said grating having the same period as said other gratings ($G_1$, $G_2$), said projectors being positioned to direct their respective bar patterns onto the object at different inclined angles ($\alpha_1$, $\alpha_2$) with respect to each other, the inclined angle ($\alpha_1$) between a first and second of said projectors ($P_1$ and $P_2$) being large relative to the inclined angle ($\alpha_2$) between the second and third of said projectors ($P_2$ and $P_3$).

16. The apparatus of claim 15 wherein said gratings $G_1$, $G_2$, $G_3$) are fixed to a common support (W) and arranged in a common grating plane which can be moved relative to said camera means (K).

17. The apparatus of claim 9 wherein said means for distinguishing said bar pattern images further comprises:

projector control means for actuating said projectors so that their respective bar patterns are directed onto the surface of the object in chronological sequence; and time-division multiplexing means associated with said projector control means and said evaluation means for coordinating said separate evaluation of said respective bar pattern images.

18. The apparatus of claim 9 wherein said means for distinguishing said bar pattern images further comprises:

means associated with said projectors for projecting said respective bar patterns in different colors; and wherein said camera means further comprises:

means for separately recording images in each of said different colors.

* * * * *